United States Patent

[11] 3,586,961

| [72] | Inventor | Richard M. Rovnyak |
| | | Hanover Park, Ill. |
| [21] | Appl. No. | 848,158 |
| [22] | Filed | Aug. 7, 1969 |
| [45] | Patented | June 22, 1971 |
| [73] | Assignee | GTE Automatic Electric Laboratories Incorporated |
| | | Northlake, Ill. |

[54] TESTING RESISTIVITY OF REED RELAY CONTACTS OVER ALL PROBABLY USED MATING SURFACES
7 Claims, 10 Drawing Figs.

| [52] | U.S. Cl. | 324/28 RS |
| [51] | Int. Cl. | G01r 3/02 |
| [50] | Field of Search | 324/2, 28 |

[56] References Cited
UNITED STATES PATENTS

| 3,217,243 | 11/1965 | Franklin | 324/28 |
| 3,510,760 | 5/1970 | Hellstrom et al. | 324/28 |

*Primary Examiner*—Alfred E. Smith
*Attorneys*—Cyril A. Krenzer, K. Mullerheim, B. E. Franz and Glenn H. Antrim

ABSTRACT: Signal generator circuits are connected to a reed switch under test to apply linearly changing current simultaneously to an operating coil and to its reed blades. Voltage developed across the contacts is amplified and differentiated while the changing current twists the blades as a result of magnetostriction. When the contacts are made through rough or contaminated areas as they are being moved by the twisting of the blades, the differentiated voltage exceeds a reference voltage and causes an indication of rejection.

INVENTOR
RICHARD M. ROVNYAK

BY Glenn H. Antrim
ATTORNEY

TESTING RESISTIVITY OF REED RELAY CONTACTS OVER ALL PROBABLY USED MATING SURFACES

BACKGROUND OF THE INVENTION

This invention pertains to a method and apparatus for testing resistance of reed relay contacts.

Relays may be tested during manufacturing by checking voltage developed across their contacts while a specified flow of current flows through them. Some of these relays passing the manufacturing tests' fail under operating conditions to have required low resistance. To determine the reason for these failures, experiments have been conducted to determine orientation of the contacts of the reed blades at different levels of current flow. These experiments show that only small areas of the overlapping surfaces of the reed blades conduct current, and that the reed blades twist slightly in amounts varying directly with the amount of current flow through them such that the location of the conducting areas change with the amount of current.

Tests using different fixed levels of current through the reed blades have been proposed for use during manufacturing. When the contacts of a relay are tested at only one or more points which are relatively smooth and are free of foreign materials, their resistance is below a specified maximum value. However, in service, the contacts may conduct a still different level of current, and the resistance at the different area of contact corresponding to the different level of current may exceed a maximum allowable value.

SUMMARY OF THE INVENTION

According to this invention, the resistance of contacts of reed switches can be tested rapidly while the current through the contacts is varied gradually from zero to the greatest value expected to be encountered by any switch in normal use. Also, current through a test coil for closing contacts is varied simultaneously to duplicate the widest variation of current expected in the operating coil of an assembled relay.

An object of this invention is to measure resistance of switch contacts over all points that are expected to be in an electrical contact in any switching application. Acceptable switches have nearly constant resistance through their closed contacts for all values of current.

DESCRIPTION OF THE PREFERRED EMBODIMENT

Figure 1:
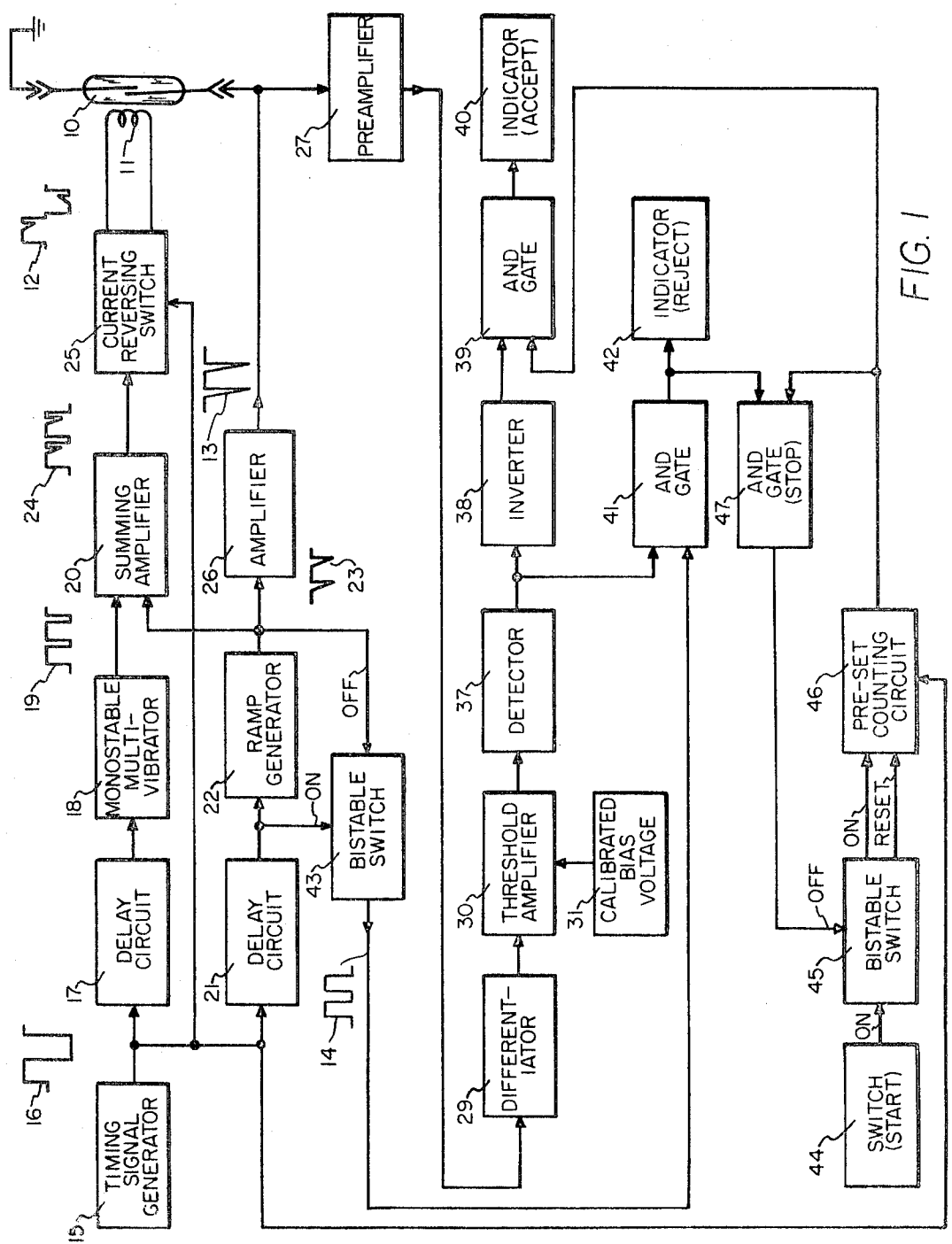
FIG. 1 is a block diagram of test circuits for testing a reed switch according to the method of this invention.

The block diagram of FIG. 1 illustrates a new combination of circuits suitable for testing reed switches that are represented by the reed switch 10. Equipment according to this circuit supplied to a test operating coil 11 current having a waveform 12 as shown in FIG. 3d, and through the contacts of the switch 10 current having the waveform 13 as shown in FIG. 3e. Both of these waveforms have ramps of current decreasing simultaneously while a strobing pulse 14 of FIG. 3f enables voltage measuring equipment to test voltage drop across the contacts of a reed switch 10. A switch 10 to be tested, is inserted through the coil 11 and its contacts are connected by a Kelvin connection to the test equipment.

Figure 3A:
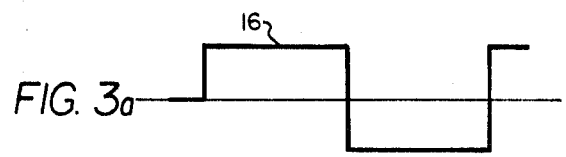
FIGS. 3a—3h are curves of waveforms of signals in the test equipment illustrated in FIG. 1.
Figure 3B:
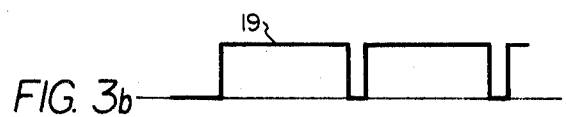
Figure 3C:
Figure 3D:
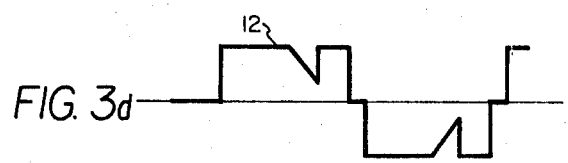
Figure 3E:
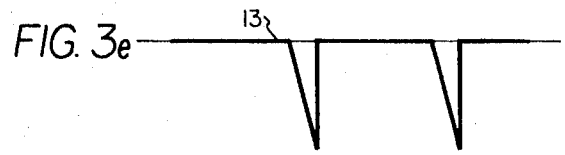
Figure 3F:
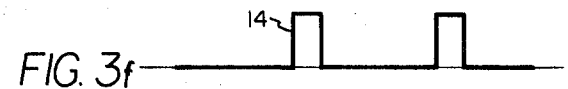

A timing signal generator 15 generates a signal having a square waveform 16, of FIG. 3a, the positive and the negative intervals each determining a test period. The output of the signal generator is connected through a delay circuit 17 to the input of a monostable multivibrator 18. The multivibrator responds to either i positive or a negative change of the timing signal 16 after it is delayed by the circuit 17 to provide successive positive square wave pulses as indicated by the waveform 19 of FIG. 3b. The output of the multivibrator 18 is connected to the first input of the two inputs of the summing amplifier 20 and determines the initial operating current to be applied to the test coil 11.

The output of the timing signal generator 15 is also implied through a delay circuit 21, having a greater delay time than that of the delay circuit 17, to the input of a ramp generator 22. The output of the ramp generator is zero until the beginning of each timing period that has been delayed by the delay circuit 21. The output of the generator 22 is then decreased linearly to provide an output according to the waveform 23. This output is applied to the second input of the summing amplifier 20 to be added to the output of the multivibrator 18 for forming at the output of the summing amplifier 20 a signal having a waveform 24. Shortly after the beginning of a timing period corresponding to one-half the period of the waveform 16, current at the output of the summing amplifier 20 rises to a maximum value, for example 60 milliamperes, long enough to be certain that a switch having desirable characteristics has operated and its contacts have become stationary, for example 40 milliseconds, and then decreases linearly to 33 milliamperes during the next 10 millisecond interval. The output of the summing amplifier 20 is applied through a current reversing switch 25 to the test operating coil 11. The current reversing switch 25 has a control input connected to the output of the timing signal generator 15 to operate the switch at the beginning of each interval to provide at the output of the switch, reversal of current according to the waveform 12 as shown in FIG. 3d.

The waveform for the current to be applied to the contacts of the switch under test is also derived from the ramp generator 22. The output of the ramp generator is applied to the input of an amplifier 26, and the output of the amplifier 26 is connected to terminals to be connected to the contacts of the switch 10 that is to be tested.

The condition of the switch 10 is determined by observing change of voltage across its contacts. The voltage across the contacts is low enough to require a Kelvin connection to the terminals of the contacts and careful shielding to prevent noise from stray electrical disturbances. The maximum current represented by the waveform 13 of the amplified ramp current may be 100 milliamperes, and typically the resistance across the closed contacts of the switch 10 is approximately 40 milliohms. The contacts of the switch 10 are connected to the shielded input circuit of a preamplifier 27. While current through a pair of contacts under test changes linearly as shown in the waveform 13 of FIG. 3e, the waveform 28 of FIG. 3g at the output of the preamplifier 27 has a ramp voltage portion 33 changing linearly as a pair of contacts are moved such that smooth clean areas are always in contact, for example, the portions at the left of the center of the contacts 48 and 49 of FIG. 2. When the current through the operating coil is reversed by the current reversing switch 25, the pair of contacts are twisted in the opposite direction, and when a particle 50 on the contact 48 engages the contact 49, increased resistance across the contacts causes an abnormally large increase in voltage as shown in the portion 35 of the curve 28. The output of the preamplifier 27 is connected to the input of the differentiator 29 to provide at the output of the differentiator a constant voltage 34 as shown in the waveform 51 of FIG. 3h during the interval that the output of the preamplifier 27 is changing linearly.

Figure 3G:
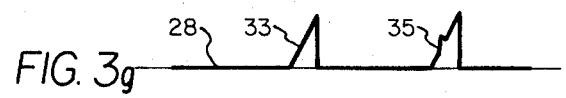
Figure 3H:
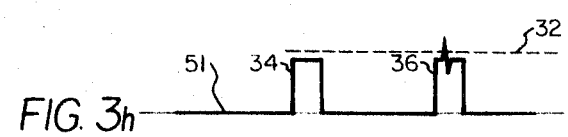

The output of the differentiator 29 is connected to one one input of two inputs of a threshold amplifier 30, and a source of calibrated threshold reference voltage 31 is connected to the other input of the amplifier 30. Only differentiated signal having an amplitude greater than the reference voltage produces an output. This threshold reference voltage is indicated by the dashed line 32 in FIG. 3h. While the change in current through the contacts is linear, the change in the voltage across the contacts that are smooth and that have no contaminating particles is linear as shown for the output 33 of the curve 28 of FIG. 3g; therefore the differential voltage 34 of curve 51 shown in FIG. 3h does not exceed the reference voltage 32, and the output of the amplifier 30 is zero. However, when the contacts encounter a point of high resistance while they are being moved relative to each other as a result of changing current flow, the change in voltage across the contacts as a result of the change in resistance is abrupt as shown for the output 35 of the curve 28 such that the differential voltage shown in the output 36 exceeds the reference voltage 32, and voltage appears in the output of the amplifier 30. The operation of differentiating the changing voltage greatly increases the sensitivity of the indicating channels; the rate of change of voltage over the abnormal, peaked portion of the curve 51 of FIG. 3h is greater relative to the normal substantially flat portion than is the departure 35 of the undifferentiated voltage of curve 28 (FIG. 3g) from the normal changing voltage having a constant slope.

The output of the amplifier 30 is connected to the input of a detector 37, and the output of the detector is connected to a circuit for operating an "accept" indicator and also to another circuit for operating a "reject" indicator. The output of the detector is connected to an indicator for showing acceptance through an inverter 38 to one input of an AND gate 39. The other input of the AND gate 39 is connected to a counting circuit described below for applying voltage to the gate during a test period. When the output of the detector 37 is zero, both the counting circuit and the inverter 38 apply voltages to their respective inputs of the AND gate 39. The output of the AND gate 39 is connected to the input of an indicator 40 to operate the indicator only when voltage is absent at the output of the detector 37 during the test period.

The output of the detector 37 is also connected to an input of an AND gate 41 of the circuit for indicating a switch is to be rejected. Another input of the AND gate 41 is connected to the output of a bistable switch 43, the bistable switch 43 has an ON input control circuit connected to the output of the delay circuit 21 and an OFF input control circuit connected to the output of the ramp generator 22 so that the output of the switch 43 has the waveform 14 of FIG. 3f. The bistable switch 43 is therefore operated to its on-state during the period that ramp currents are being applied to the test coil 11 and to the contacts of the reed switch 10. When the switch is on, a voltage is applied to the respective input of the AND gate 41, and when the differentiated signal 36 of FIG. 3h exceeds the reference voltage 32, voltage is also applied to that input of the AND gate connected to the output of the detector 37 so that the AND gate conducts voltage to the indicator 42.

The system for testing contacts can be supplied with various starting circuits and counting circuits to provide either manual staring or automatic starting for testing each switch either once or successively a specified number of times. A bistable switch 45 is turned on by operation of a starting switch 44. The switch 45 has two outputs connected to a preset counting circuit 46. The counting circuit starts to count in response to the application of the voltage to one of its input circuits, and after a predetermined number of counts applies voltage to an input of the AND gate 47 and also to an input of the AND gate 39. Another input of the AND gate 47 is connected to the output of the AND gate 41 so that voltage is applied to both inputs of the AND gate 47 at the end of a counting period when the voltage at the output of the detector 37 indicates that a switch under test ought to be rejected. The application of voltage to both inputs of the AND gate 47 causes voltage at the output of the gate to be applied to an OFF-control circuit of the bistable switch 45. In response to the application of the OFF voltage the bistable switch 45 operates to its RESET state to apply a voltage to the counting circuit 46 to cause it to be reset in preparation for another counting cycle to be started by operation of the starting switch 44.

Figure 2:
FIG. 2 is an enlarged cross-sectional view of overlapping contacts of a reed switch.

The accepted theory is that the twisting of the reed blades is caused by magnetostriction. A cross section of contacts of mating reed blades 48 and 49 is shown in FIG. 2. The amount of curvature of the contacts of the blades 48 and 49 and the size of a particle 50 near the right edge of the contact of the blade 48 are exaggerated to show the effect of microscopic contours on resistance. The surfaces are assumed to be smooth and free of contaminating particles except for the particle 50.

If the current flow through the blades 48 and 49 and current flow through an operating coil for the blades is in such relative directions that the twist between the blades causes that portion of the contacts between their centers and their left edges to be conductive, the resistance of the contacts is at a desirable minimum value. As long as current flow through the operating winding is sufficient to maintain the contacts closed, the amount by which the blades twist varies directly with the current flow through the blades and tends to vary indirectly with the current flow through the operating winding. As the current through the operating winding is decreased, the twist may increase because the opposition to twisting resulting from the force holding the contacts together decreases more rapidly than the decrease of torque caused by magnetostriction.

A reversal of the current either through the blades 48 and 49 or through the operating winding causes the direction of twisting to reverse such that at certain combinations of amounts of current flow, the particle or projection 50 constitutes the conducting portion of the contact. When these combinations of amount of current are encountered in normal use, the resistance between the contacts 48 and 49 caused by the particle 50 is likely to exceed a specified maximum resistance. The test procedure described above tests the contacts over their entire usable surfaces such that failure in normal use can often be prevented.

I claim:
1. The method of testing reed switch contacts comprising:
   providing an ample flow of operating current through the operating winding of a reed switch under test for a first period sufficiently long to close its contacts,
   during a second period immediately following said first period continuing to provide said operating current and in addition applying a flow of current through said contacts, the flow of current through said contacts gradually changing according to a predetermined curve, the point through which current is conducted through the mating surfaces of said contacts being gradually moved over said surfaces as a result of a slight twisting of the reeds caused by said changing flow of current, and
   detecting across said contacts voltage that is abnormally high at any instant during said second period during which the flow of current is being changed through said contacts.

2. The method of testing reed switch contacts according to claim 1 wherein said predetermined curve is linear, the detection of said abnormally high voltage across said contacts being determined by differentiating said voltage developed across said contacts, and detecting said differentiated voltage above a maximum acceptable constant level.

3. The method of testing reed switch contacts according to claim 2 wherein said test is repeated while applying said operating current in a reverse direction.

4. The method of testing reed switch contacts according to claim 3 wherein said operating current changes from an initial ample flow to a minimum amount of flow still sufficient to maintain said contacts closed while said current flowing through said contacts during said second period is being decreased linearly.

5. A test circuit for testing reed switches comprising in combination:
   a timing signal generator for marking successive timing periods,
   a current generator having delay means connected to said timing signal generator and current generating means connected to said delay means responsive to signal from said timing signal generator to develop a maximum level of current starting a predetermined time after the start of each of said timing periods, additional delay means connected to said timing signal generator and a ramp current forming means connected to said additional relay means and to said current generating means, said ramp current forming means being effective a predetermined interval after the start of said maximum level of current to decrease linearly the output of said current generating means to a minimum level of current before the end of each of said timing periods, means connecting a test coil for reed switches under test to the output of said current generator, contact current generating means having a pair of test terminals adapted to receive the reed terminals of a reed switch under test and to provide current through the contacts of the reed switch, and voltage measuring means connected across said pair of test terminals for determining any peaks of voltage above a predetermined maximum value across said pair of test terminals while the output of said current generator is being decreased linearly.

6. A test circuit as claimed in claim 5 wherein said means for connecting said test coil includes a current reversing switch.

7. A test circuit as claimed in claim 6 wherein said voltage measuring means includes an amplifier and a differentiator connected to said test terminal, detecting means connected to said differentiator, said detecting means being biased to provide an output only when the voltage across said pair of test terminals exceeds said predetermined maximum value.